US006885536B1

(12) United States Patent
Kim

(10) Patent No.: US 6,885,536 B1
(45) Date of Patent: Apr. 26, 2005

(54) METHOD AND APPARATUS FOR MAGNETICALLY GENERATING MOTION WITH HIGH PRECISION

(75) Inventor: Won-jong Kim, College Station, TX (US)

(73) Assignee: The Texas A&M University System, College Station, TX (US)

( * ) Notice: Subject to any disclaimer, the term of this patent is extended or adjusted under 35 U.S.C. 154(b) by 413 days.

(21) Appl. No.: 10/232,626

(22) Filed: Aug. 30, 2002

Related U.S. Application Data

(60) Provisional application No. 60/316,920, filed on Aug. 31, 2001.

(51) Int. Cl.[7] .............................................. H01H 51/22
(52) U.S. Cl. ...................................... 361/143; 361/160
(58) Field of Search ................................ 361/139, 143, 361/146, 160, 166, 191; 336/5, 70, 150, 184, 196

(56) References Cited

U.S. PATENT DOCUMENTS

| | | | |
|---|---|---|---|
| 3,376,578 A | | 4/1968 | Sawyer |
| 4,338,657 A | * | 7/1982 | Lisin et al. .................... 363/68 |
| 4,535,278 A | | 8/1985 | Asakawa |
| 4,588,971 A | * | 5/1986 | Beisser .......................... 336/5 |
| 4,639,705 A | * | 1/1987 | Beisser .......................... 336/5 |
| 4,874,998 A | | 10/1989 | Hollis, Jr. |
| 4,885,490 A | | 12/1989 | Takahara et al. |
| 4,900,962 A | | 2/1990 | Hockney et al. |
| 5,382,885 A | | 1/1995 | Salcudean et al. |
| 5,631,618 A | | 5/1997 | Trumper et al. |
| 5,745,447 A | * | 4/1998 | Kang ...................... 369/44.15 |
| 5,789,838 A | * | 8/1998 | Gondhalekar .............. 310/90.5 |

OTHER PUBLICATIONS

J. Butterfass, et al., "DLR's Multisensory Articulated Hand Part I: Hard–and Software Architecture", Proceedings of the 1998 IEEE International Conference on Robotics and Automation, pp. 2081–2086, May 1998.
S.-J. Steve Chen, et al., "A Magnetically Levitated, Automated, Contact Analytical Probe Tool", IEEE Transactions on Semiconductor Manufacturing, vol. 8, No. 1, pp. 72–78, Feb. 1995.
D. Ebihara, et al., "Study of a Basic Structure of Surface Actuator", IEEE Transactions on Magnetics, vol. 25, No. 5, pp. 3916–3918, Sep., 1989.
A. A. Gupta, et al., "Six Degree–of–Freedom, Magnetically–Suspended Fast–Steering Mirror (MSFSM) Tracks Atmospheric Turbulence While Providing Focusing and Collimation Travel", 14th Annual AAS Guidance and Control Conference, Keystone, Colorado, 16 unnumbered sheets, Feb. 2–6, 1991.
W. E. Hinds, et al., "The Sawyer Linear Motor", Proceedings of the Second Symposium on Incremental Motion Control Systems and Devices, pp. W–1 through W–10, 1973.

(Continued)

*Primary Examiner*—Stephen W. Jackson
*Assistant Examiner*—Danny Nguyen
(74) *Attorney, Agent, or Firm*—Baker Botts L.L.P.

(57) ABSTRACT

An apparatus includes first and second sections supported for relative movement, the first section having a plurality of first portions extending along respective different axes, and the second section having approximately annular second portions which each have a respective first portion extending movably therethrough to define a pair. Each portion can generate a magnetic field, the magnetic field generated by one of the portions of each pair being a function of an electrical signal. Interaction of the magnetic fields generated by the portions of each pair urge movement of the first portion relative to the second portion in a direction approximately along the axis of the first portion.

22 Claims, 7 Drawing Sheets

OTHER PUBLICATIONS

R. L. Hollis, et al., "A Six–Degree–of–Freedom Magnetically Levitated Variable Compliance Fine–Motion Wrist: Design, Modeling, and Control", IEEE Transactions on Robotics and Automations, vol. 7, No. 3, pp. 320–332, Jun., 1991.

M. Holmes, et al., "The long–range scanning stage: a novel platform for scanned–probe microscopy", Precision Engineering, vol. 24, No. 3, pp. 191–209, Jul. 2000.

G. D. Hutcheson, "Ten Trends Shaping the Next 10 Years", Solid State Technology, May, 1997, 4 sheets.

W.–J. Kim, et al., "High–precision magnetic levitation stage for photolithography", Precision Engineering, vol. 22, No. 2, pp. 66–77, Apr., 1998.

J. P. Lauffer, et al., "Milling Machine for the 21$^{st}$ Century—Goals, Approach, Characterization and Modeling", Proc. SPIE, vol. 2721, pp. 326–340, 1996.

C. S. Lovchik, et al., "The Robonaut Hand: A Dexterous Robot Hand for Space", Proceedings of the 1999 IEEE International Conference on Robotics and Automation, 6 unnumbered pages, May 1999.

S. P. Murarka, "Directions in the Chemical Mechanical Planarization Research", Proceedings of Material Research Society Symposium, vol. 566, pp. 3–11, 2000.

J. F. O'Brien, et al., "Six–axis vibration isolation technology applied to spacebourne interferometers", Proceedings of the SPIE, vol. 2477, pp. 9–19, 1995.

P. Oertil–Cajacob, "New Machine Concepts Open Up Market Opportunities", European Production Engineering, vol. 19, No 1–2, pp. 6–7 and title page, Apr. 1995.

K. Park, et al., "Magnetic Levitated High Precision Positioning System Based on Antagonistic Mechanism", IEEE Transactions on Magnetics, vol. 32, No. 1, pp. 208–219, Jan., 1996.

E. R. Pelta, "Two–Axis Sawyer Motor", Proceedings of the 12$^{th}$ Annual IEEE Industrial Electronics Society Conference, pp. 3–8, 1986.

C. Pernechele, et al., "Hexapod control for an active secondary mirror: general concept and test results", Applied Optics, vol. 37, No 28, pp. 6816–6821, Oct., 1998.

Z. H. Rahman, et al., "Multi–axis vibration isolation, suppression and steering system for space observational applications", Proceedings of the SPIE, vol. 3351, pp. 73–81, 1998.

S. E. Salcudean, et al., "Design and Control of a Force–Reflecting Teleoperation System with Magnetically Levitated Master and Wrist", IEEE Transactions on Robotics and Automations, vol. 11, No. 6, pp. 844–858, Dec., 1995.

J. K. Salisbury, Jr., "The heart of microsurgery", Mechanical Engineering, vol. 120, No. 12, Dec., 1998, 12 sheets.

"The International Technology Roadmap for Semiconductors: 2001", Semiconductor Industry Association, p. 4, 2001.

R. Trucco, et al., "Hexapod Pointing System", Proceedings of the 3$^{rd}$ International Conference on Spacecraft Guidance, Navigation and Control Systems, The Netherlands, pp. 201–208, Nov., 1996.

D. L. Trumper, et al., "Design and Analysis Framework for Linear Permanent–Magnet Machines", IEEE Transactions on Industry Applications, vol. 32, No. 2, pp. 371–379, Mar./Apr. 1996.

H.–J. Warnecke, et al., "Development of Hexapod Based Machine Tool", CIRP Annals–Manufacturing Technology, vol. 47, No. 1, 4 unnumbered pages, 1998.

S. Earnshaw, "On the Nature of the Molecular Forces which Regulate the Constitution of the Luminiferous Ether", Transactions of the Cambridge Philosophical Society, vol., 7, pp. 97–112, 1842.

W.–J. Kim, et al., "Modeling and Vector Control of Planar Magnetic Levitator", IEEE Transactions on Industry Applications, vol. 34, No. 6, pp. 1254–1262, Nov./Dec. 1998.

W.–J. Kim, et al, "Linear Motor–Levitated Stage for Photolithography", Annals of the CIRP, vol. 46, No. 1, pp. 447–450, Aug., 1997.

M. C. Roco, "A Frontier for Engineering", Mechanical Engineering, vol. 123, No. 1, pp. 52–55, Jan. 2001.

D. S. Goldin, et al., "The Great Out of the Small", Mechanical Engineering, vol. 122, No. 11, pp. 70–79, Nov. 2000.

"Nanotechnology: Shaping the World Atom by Atom", National Science and Technology Council, Committee on Technology, the Interagency Working Group on Nanoscience, Engineering and Technology (IWGN), Washington D.C., Sep., 1999, 12 sheets.

"Nanotechnology Research Directions: IWGN Workshop Report", National Science and Technology Council, Committee on Technology, title page and pp. 1–16 and 77–96, Sep. 1999.

M. Hoummady, et al., "Micromachines for nanoscale science and technology", Nanotechnology, vol. 10, No. 1, pp. 29–33, Mar., 1999.

C. Baur, et al., "Nanoparticle manipulation by mechanical pushing: underlying phenomena and real–time monitoring", Nanotechnology, vol. 9, No. 4, pp. 360–364, Dec., 1999.

L. T. Hansen, et al., "A technique for positioning nanoparticles Using an atomic force microscope", Nanotechnology, vol. 9, No. 4, pp. 337–342, Dec., 1998.

R. C. Merkle, "Convergent assembly", Nanotechnology, vol. 8, No. 1, pp. 18–22, Mar., 1997.

G. Binning, et al., "Surface Studies by Scanning Tunneling Microscopy", Physical Review Letters, vol. 49, No. 1, The American Physical Society, pp. 57–61, Jul. 5, 1982.

G. Binnig, et al, "Atomic Force Microscope", Physical Review Letters, vol. 56, No. 9, The American Physical Society, pp. 930–933, Mar. 3, 1986.

W.–J. Kim, "Six–Axis Nano–Positioning with Planar Magnetic Levitation", IEEE Proceedings for Nano 2001, First IEEE Conference on Nanotechnology, pp. 174–179, Oct., 2001, 6 unnumbered pages.

W.–J. Kim, et al., "High–Precision Control of a Maglev Linear Actuator with Nanopositioning Capability", Proceedings of Automatic Controls Conference 2002, May, 2002, 6 unnumbered pages.

S. J. Ludwick, et al., "Modeling and Control of a Six Degree–of–Freedom Magnetic/Fluidic Motion Control Stage", IEEE Transactions on Control Systems Technology, vol. 4, No. 5, pp. 553–564, Sep., 1996.

"Societal Implication of Nanoscience and Nanotechnology", National Science Foundation, title page and pp. 3–12 and 104–162, Mar., 2001.

R. M. Taylor II, et al., "The Nanomanipulator: A Virtual–Reality Interface to a Scanning Tunneling Microscope", Excerpt from Ph.D. Dissertation, Department of Computer Science, University of North Carolina at Chapel Hill, title page and pp. iii–iv and 1–10, May, 1994.

S. Paulson, et al., "Tunable Resistance of a Carbon Nanotube–Graphite Interface", Science, vol. 290, pp. 1742–1744, Dec. 1, 2000.

M. F. Yu, et al, "Three–dimensional manipulation of carbon nanotubes under a scanning electron microscope", Nanotechnology, vol. 10, pp. 244–252, 1999.

M. F. Yu, et al., "Strength and Breaking Mechanism of Multiwalled Carbon Nanotubes under Tensile Load", Science, vol. 287, Jan. 28, 2000, 6 pages.

K. Takahara, et al., "Development of a Magnetically Suspended, Tetrahedron–Shaped Antenna Pointing System", Proceeding of NASA CP–2056, $22^{nd}$ Aerospace Mechanism Symposium, pp. 133–147, May 1988.

S. E. Salcudean, et al., "6–DOF Desk–Top Voice–Coil Joystick", Proceedings of the ASME Dynamic Systems and Control Division, vol. 61, pp. 131–137, 1997.

R. L. Hollis, et al., "Lorentz Levitation Technology: a New Approach to Fine Motion Robotics, Teleoperation, Haptic Interface, and Vibration Isolation", $5^{th}$ International Symposium on Robotics Research, Hidden Valley, Pennsylvania, pp. 1–18, Oct., 1993.

K.–B. Choi, et al., "Moving–magnet type precision miniature platform for fine positioning and compliant motion", Mechatronics, vol. 11, pp. 921–937, Oct., 2001.

K. S. Jung, et al., "Development of a novel maglev positioner with self–stabilizing property", Mechatronics, vol. 12, pp. 771–790, Jun., 2002.

T. Higuchi, et al., "Development of Magnetically–Suspended, Tetrahedron–Shaped Antenna Pointing System", $2^{nd}$ International Symposium on Magnetic Bearing, pp 9–14, Tokyo, Japan, Jul. 12–14, 1990.

M. Tsuda, et al., "Design and Control of Magnetic Servo Levitation", Proceedings of the $20^{th}$ International Symposium on Industrial Robots, Tokyo, Japan, pp. 693–700, Oct. 4–6, 1989.

K. Takahara, et al., "Development of a Magnetically Suspended, Tetrahedron–Shaped Antenna Pointing System" $22^{nd}$ Aerospace Mechanisms Symposium, Hampton, Virginia, title page and pp. 133–147, May, 1988.

S. J. Ludwick, et al., "Feedback Linearization in a Six Degree–of–Freedom Mag–Lev Stage", NASA Third International Symposium on Magnetic Suspension Technology, Tallahassee, Florida, Dec. 13–15, 1995, pp. 95–107.

S. J. Ludwick, et al., "Design and Control of a Six Degree–of–Freedom Magnetic/Fluidic Motion Control Stage", 1995 International Mechanical Engineering Conference and Exposition, San Francisco, California, Nov. 1995, 8 unnumbered pages.

* cited by examiner

METHOD AND APPARATUS FOR MAGNETICALLY GENERATING MOTION WITH HIGH PRECISION

This application claims the priority under 35 U.S.C. § 119 of provisional application No. 60/316,920 filed Aug. 31, 2001.

TECHNICAL FIELD OF THE INVENTION

This invention relates in general to generation of motion and, more particularly, to generation of motion with high precision and multiple degrees of freedom.

BACKGROUND OF THE INVENTION

There is an ever-increasing need for greater precision with respect to motion generation and position measurement, for purposes of applications commonly referred to as "nanoscale" science and engineering. Examples of relevant applications include manufacture of nanoscale structures, atomic-level handling and manipulation of materials, assembly and packaging of microparts, vibration isolation for delicate instrumentation, seismic motion detection, human-computer interfaces for dexterous robotics, and motion/force feedback for applications such as virtual reality and telepresence situations.

In regard to telepresence situations, teleoperations in robotics and manufacturing is an emerging technology that can extend the range of human activities. For example, humans can use robots to perform dexterous manipulation, without exposing themselves to harsh and remote environments, such as space or nuclear reactors. As another example, telepresence surgery by a surgeon is gaining popularity, in part because it permits a specialist located in one city to perform a sophisticated surgical operation on a patient located in a different city. In telepresence surgery, high fidelity force and tactile reflection is need to enhance sensitivity.

As another example of an application needing high-resolution motion generation and position measurement, research is being conducted regarding what is known as nano-pinning phenomenon in type II high temperature superconductive materials, and its possible application to next-generation mass data storage devices which have storage densities in excess of $10^{10}$ bits per square centimeter. The pinning process dopes atoms into a type II high-temperature thin film crystalline superconductor structure, with 5 nanometer separation. Recording and erasing data on this lattice structure can be achieved by precisely positioning a magnetic force microscope (MFM) head over the pinning sites. However, a significant technical hurdle to possible implementation of such devices is the need for equipment that can achieve positioning with nanometer-level resolution and repeatability, because pre-existing technologies are not well suited to this task.

Still another potential application relates to the fabrication of integrated circuits. During the next few years, the critical size for integrated circuit devices is expected to be approximately 100 nanometers. Consequently the overlay accuracy needed for photolithography equipment (such as wafer steppers and scanners) during fabrication of these devices should be about 20 nanometers, or better. Pre-existing technologies present difficulties in achieving this level of accuracy.

Various different approaches have previously been developed, in an attempt to provide suitable motion generation and position detection for small-scale applications. However, many of these approaches involve complex mechanical elements and linkages, which are relatively expensive, and in which tolerances can accumulate in a manner that reduces resolution. Also, many of the existing approaches utilize precision bearing surfaces, but even precision bearing surfaces can involve non-linear and stochastic problems such as friction, stiction, backlash and the like. Further, precision bearing surfaces contribute to increased manufacturing expense.

In one pre-existing approach, which avoids some of these problems, a movable part is magnetically levitated, and can be controlled in multiple degrees of freedom. However, while pre-existing magnetic levitation systems have been generally adequate for some applications, they have not been satisfactory in all respects. For example, the movable part typically has one or more electrically energized coils, which cause heating of the moving part due to dissipation of heat within the coils. Further, an umbilical cable is needed for the moving part, in order to carry control signals to the coils, but it is possible for the umbilical cable to transmit vibrations to the moving part in a magnitude which is significant in comparison to the nano-scale positioning and resolution needed for many applications. Further, the moving part typically has a relatively heavy weight, due in part to the coils thereon. The weight affects the natural frequencies of the system, and decreases the response time.

SUMMARY OF THE INVENTION

From the foregoing, it may be appreciated that a need has arisen for a method and apparatus for effecting motion generation and/or position measurement with a high resolution consistent with nano-scale applications. According to the present invention, a method and apparatus are provided to address this need, where first and second sections are supported for relative movement, the first section having a plurality of first portions which extend along respective different axes, and the second section having a plurality of approximately annular second portions which each extend around a respective axis and which each have a respective first portion extending movably therethrough, each second portion and the first portion extending therethrough being a respective pair. The first portion of each pair is caused to generate a magnetic field, and the second portion of each pair is caused to generate a magnetic field which is approximately annular, the magnetic field generated by one of the portions of each pair being a function of an electrical signal. The magnetic fields generated by the portions of each pair interact in a manner urging movement of the first portion relative to the second portion in a direction approximately along the axis associated with the first portion.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
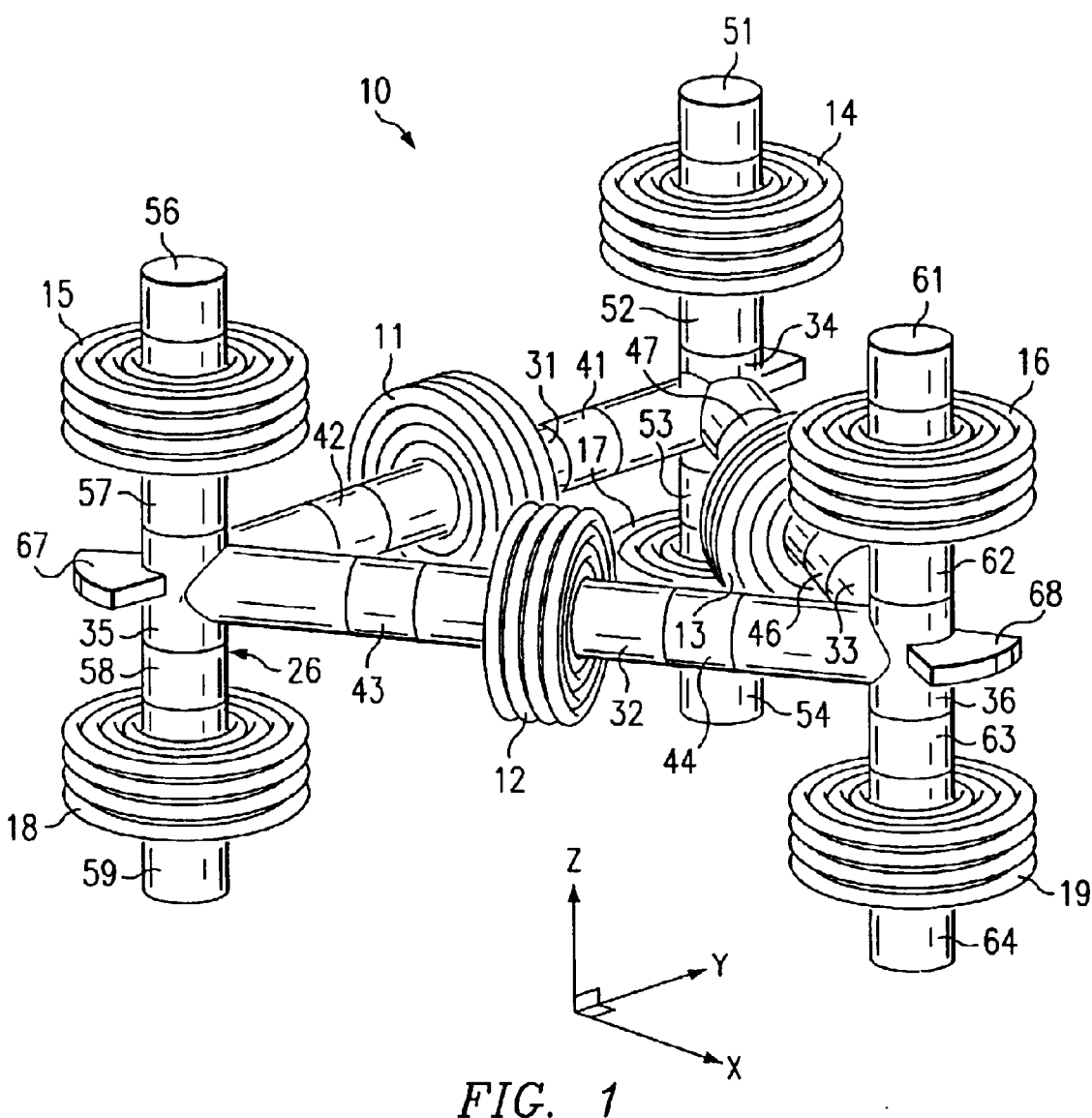
FIG. 1 is a diagrammatic perspective view of an apparatus which is part of a magnetic levitation system that embodies aspects of the present invention.

FIG. 1 is a diagrammatic perspective view of an apparatus 10 which is part of a magnetic levitation system that embodies aspects of the present invention. The apparatus 10 includes nine annular coils 11–19 made of electrically conductive wire. The coils are each fixedly mounted on a stationary support, which has been omitted from FIG. 1 for clarity. The coils 11–19 can each act as an electromagnet, as discussed later. The coils 14 and 17 are coupled in series, so that the same current thus flows through each of them. Similarly, the coils 15 and 18 are coupled in series, and the coils 16 and 19 are coupled in series.

The apparatus 10 also includes a rigid frame 26, which is supported for movement relative to the coils, and which includes six cylindrical struts 31–36 that are fixedly secured together in any suitable manner, for example through use of an epoxy adhesive of a known type. The struts 31–36 each extend movably through one or two of the coils 11–19. The central axes of the struts 31–33 all extend horizontally, and the central axes of the struts 34–36 all extend vertically. The three struts 31–33 are arranged to form an equilateral triangle. The other three struts 34–36 each extend perpendicular to the plane of the equilateral triangle, at a respective apex thereof. Approximately half of the length of each of the struts 34–36 is disposed above the plane of the triangle, and approximately half is disposed below the plane of the triangle.

The strut 31 includes two spaced permanent magnets 41 and 42 of cylindrical shape. The remainder of the strut 31 is made of a non-magnetic material, which in the disclosed embodiment is aluminum. In other words, the center and end portions of the strut 31 are made of cylindrical aluminum pieces, and the cylindrical magnets 41 and 42 are each disposed between the center portion and a respective one of the end portions. The magnets 41 and 42 are fixedly secured to the non-magnetic pieces of the strut in any convenient manner, for example through use of a suitable epoxy adhesive of a type known in the art. In the disclosed embodiment, the magnets 41 and 42 are each made of neodymium iron boron. (NdFeB), but these magnets could alternatively be made of some other suitable magnetic material, or could be some other type of structure capable of generating a magnetic field. Due to the fact that NdFeB is subject to corrosion, the exposed surface of each NdFeB magnet is coated, for example with a phenolic resin of a known type.

The struts 32 and 33 are each similar to the strut 31. In particular, the strut 32 includes two spaced NdFeB permanent magnets 33 and 34, the remainder of the strut 32 being made of non-magnetic aluminum material. Similarly, the strut 33 includes two spaced permanent NdFeB magnets 46 and 47, the remainder of the strut 33 being made of non-magnetic aluminum material.

The strut 34 includes four spaced permanent NdFeB magnets 51–54. The magnets 51 and 54 are at opposite ends of the strut 34, and the remainder of the strut 34 is defined by three non-magnetic aluminum pieces which are respectively disposed between the magnets 51 and 52, between the magnets 52 and 53, and between the magnets 53 and 54. The non-magnetic piece in the middle of the strut 34 is fixedly secured to the ends of the struts 31 and 33.

The strut 35 is similar to the strut 34, in that it includes four spaced permanent NdFeB magnets 56–59, and three non-magnetic aluminum pieces which serve as spacers. The non-magnetic piece in the center is fixedly secured to the ends of the struts 31 and 32. The strut 36 is also similar to the strut 34, in that it includes four spaced permanent NdFeB magnets 61–64, and three non-magnetic pieces disposed in the spaces between the magnets. The non-magnetic piece in the center of the strut 36 is fixedly secured to the ends of the struts 32 and 33.

Each of the three vertical struts 34–36 has, on the outer side of the non-magnetic center portion thereof, a horizontally outwardly projecting flange. Two of these flanges are visible at 67 and 68 in FIG. 1. In the embodiment of FIG. 1, each of the permanent magnets has a diameter of about 10 millimeters and an axial length of about 9.5 millimeters, and the spacer separating each pair of magnets has a diameter of about 10 millimeters and an axial length of about 4 millimeters. However, it would alternatively be possible to use other suitable dimensions, for example in the context of other applications.

In a variation of the embodiment of FIG. 1, the six struts 31–36 could each include a tube which is made of a non-magnetic material. The tube of each strut would have therein all of the structure of the strut which is visible in FIG. 1, except that the flanges (such as those shown at 67–68) would each be provided on the outside of a respective tube. For example, the tubes could each be made of brass with a relatively thin wall thickness, such as a wall thickness of about 0.35 millimeter.

Figure 2:
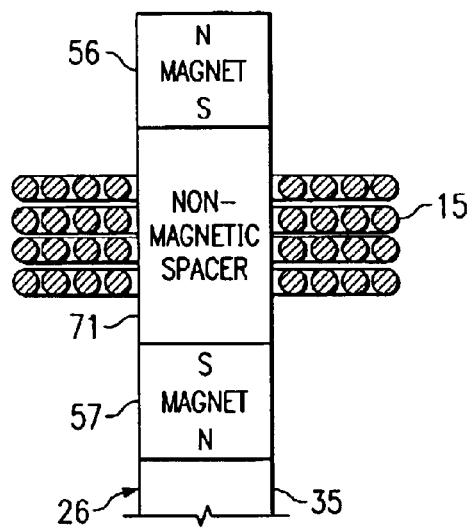
FIG. 2 is a diagrammatic fragmentary sectional view of part of the apparatus at FIG. 1.

FIG. 2 is a diagrammatic central sectional view showing the upper end of the strut 35 of FIG. 1, and showing the coil 15 which encircles the upper end of the strut 35. The non-magnetic aluminum spacer between the permanent magnets 56 and 57 is identified by reference numeral 71. As evident in FIG. 2, the magnets 56 and 57 are oriented so that the south pole of each is located immediately adjacent the spacer 71, and so that the north pole of each is remote from the spacer 71. Since the south poles of the two magnets are adjacent, the magnets will tend to repel each other. Consequently, one of the reasons that an epoxy adhesive is used to secure the magnets 56 and 57 to the spacer 71 is that the holding force of the epoxy adhesive is sufficiently strong to resist the repulsion force acting between the magnets. In FIG. 2, the coil 15 is shown as having 16 turns, but this merely exemplary, and the coil 15 may alternatively have a larger or smaller number of turns.

As evident from FIG. 2, the coil 15 is aligned axially with the spacer 71, and the magnets 56 and 57 are basically disposed on opposite sides of the coil 15. The magnets 56 and 57, the spacer 71 and the coil 15 effectively form a single-axis linear actuator.

When a current is passed in a first or forward direction through the wire of the coil 15, which in a top view of the coil 15 involves current flow in a counterclockwise direction, the coil 15 generates a magnetic field which has an annular characteristic. This magnetic field includes near the upper end of the spacer 71 a north pole which attracts the south pole of the magnet 56, and includes near the lower end of the spacer 71 a south pole which repels the south pole of magnet 57. Consequently, the magnetic field generated by the coil 15 urges both of the magnets 56 and 57 downwardly in relation to the stationary coil 15, such that the strut 35 is urged downwardly in a direction parallel to the central axis of strut 35. The magnitude of the force acting on the strut 35 can be varied by changing the magnitude of the current flowing through the coil 15.

In contrast, if current is passed in an opposite or reverse direction through the coil 15, which in a top view of the coil 15 involves current flow in a clockwise direction, an opposite magnetic field is generated. In particular, the magnetic field generated by the coil 15 includes near the lower end of spacer 71 a north pole which attracts the south pole of magnet 57, and includes near the upper end of spacer 71 a south pole which repels the south pole of magnet 56. The magnets 56 and 57 are thus both urged upwardly relative to the stationary coil 15, such that the entire strut 26 is urged upwardly, in a direction parallel to the central axis of strut 26. The magnitude of the force acting on the strut 35 can be varied by changing the magnitude of the current flowing through the coil 15. The length of the spacer 71, and thus the spacing between the magnets 56 and 57, is selected to optimize the forces exerted on the strut 35 by the interacting magnetic fields.

Figure 3:
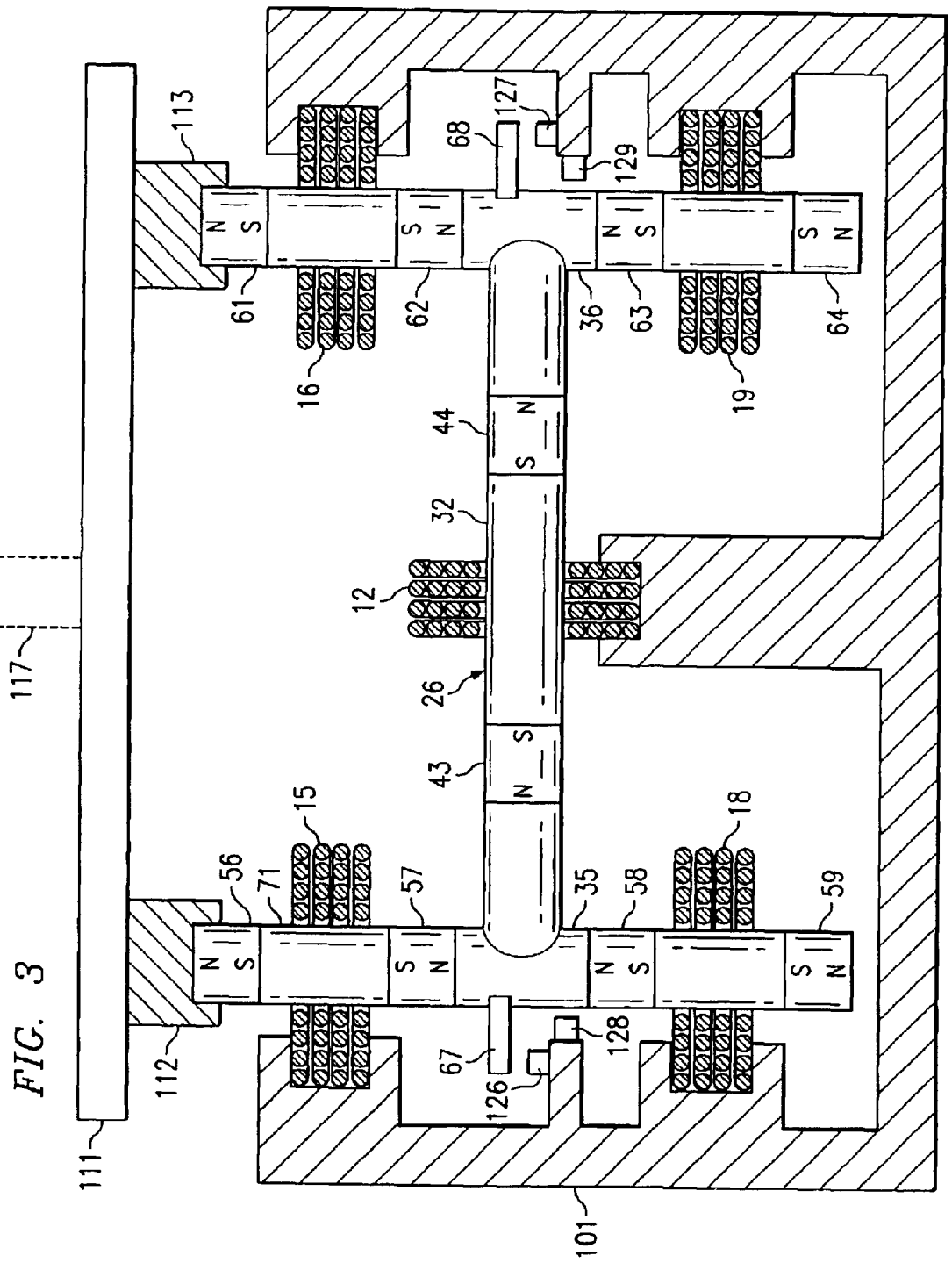
FIG. 3 is a diagrammatic sectional view showing the apparatus of FIG. 1, and also showing a support and a table which have been omitted from FIG. 1 for clarity.

FIG. 3 is a diagrammatic sectional view of the apparatus 10 of FIG. 1, and also shows some additional structure. More specifically, FIG. 3 corresponds to a section plane which contains the center axes of the three struts 32, 35 and 36, and which contains the center axes of the coils 12, 15–16 and 18–19. In addition, FIG. 3 shows at 101 the stationary support on which all of the coils 11–19 are fixedly mounted.

Moreover, FIG. 3 shows a table 11, which is supported on the movable frame 26. In particular, the table 11 has three short downwardly-projecting legs, two of which are visible at 112 and 113. Each of these three legs is removably supported on the upper end of a respective one of the vertical struts 34–36 of the frame 26. In FIG. 3, each of these three legs has, in the lower end thereof, a shallow cylindrical recess which receives the upper end of the associated strut. However, the legs could be each removably supported on the struts 34–36 in some other manner. The table 111 can support an object which is to be positioned, as indicated diagrammatically by broken lines at 117. For example, the object 117 could be a specimen which is under investigation.

The support 101 has six sensors mounted thereon in a symmetrical manner, and four of these six sensors are visible in FIG. 3 at 126–129. Three of the six sensors are each disposed a small distance below a respective one of the flanges on the vertical struts 34–36. For example, in FIG. 3, the sensors 126 and 127 are each disposed below a respective one of the flanges 67–68. Each of the sensors 126 and 127 provides very accurate detection of the distance between itself and the associated flange, thereby providing accurate information regarding the vertical position of each of the three struts 34–36, and thus the vertical position of the overall frame 26.

The remaining three sensors are each spaced a small distance horizontally from a side surface of a respective one of the vertical struts 34–36. For example, FIG. 3 shows two sensors 128 and 129 which are each spaced a small horizontal distance from a respective one of the struts 35 and 36. Each of these sensors provides a very accurate determination of the horizontal distance from the sensor to the associated strut, thereby providing a very accurate indication of the horizontal position of the frame 26 within a two-dimensional reference system.

In the disclosed embodiment, the six sensors discussed above are each a capacitive sensor of a known type, and in particular are sensors which can be commercially obtained under catalog number ADE-2810 from ADE Corporation of Newton, Mass. The system also includes ADE-3800 electronics from ADE Corporation to provide an operational interface to the ADE-2810 sensors. However, it would alternatively be possible to utilize any other suitable sensors and/or interface circuit.

Figure 4:
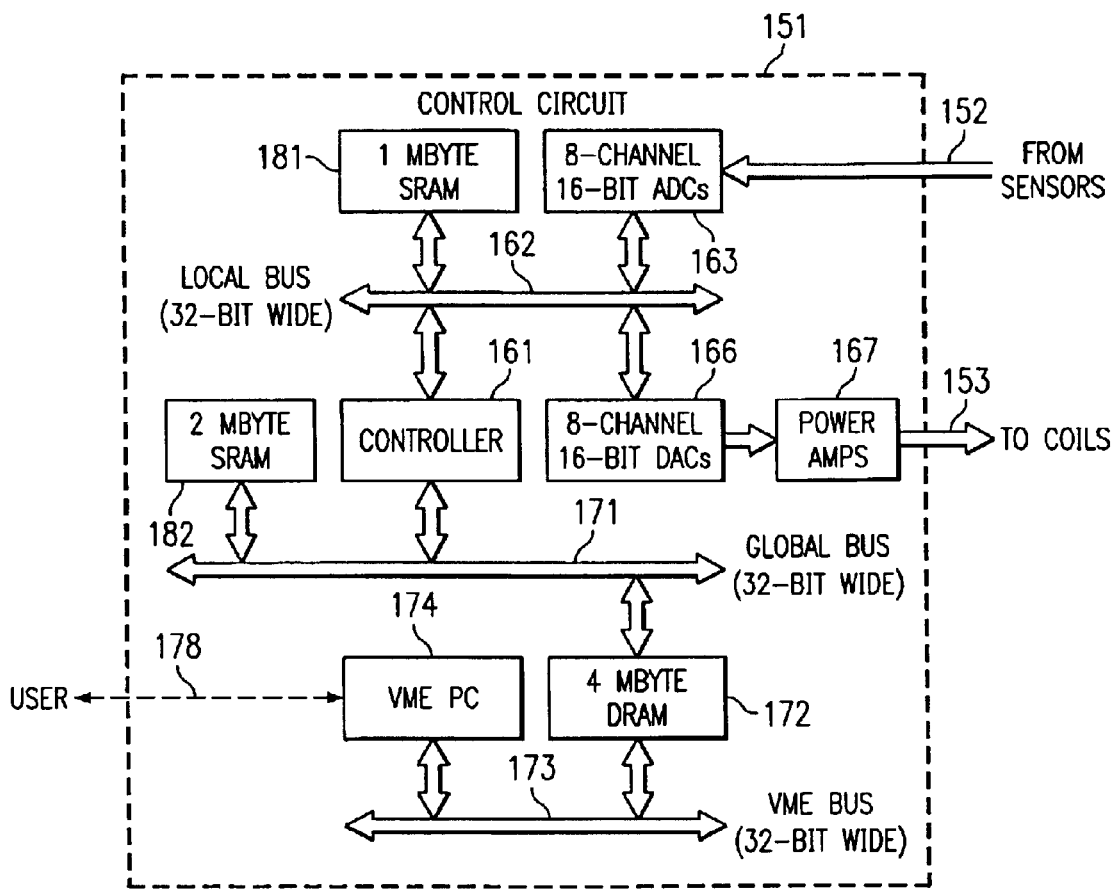
FIG. 4 is a schematic block diagram of a control circuit which is used to control the apparatus of FIGS. 1–3.

FIG. 4 is a schematic block diagram of a control circuit 151 which is a further part of the system that includes the apparatus shown in FIGS. 1–3. The control circuit 151 has six input lines at 152, which are each coupled to the output of a respective one of the six sensors, including the four sensors shown at 126–129 in FIG. 3. The control circuit 151 has nine outputs 153, each of which is coupled to a respective one of the coils shown at 11–19 in FIG. 1.

The control circuit 151 includes a controller 161 which, in the disclosed embodiment, is implemented with a model 4284 circuit board commercially available from Pentek, Inc. of Norwood, N.J. This board includes a model 320C40 digital signal processor (DSP) made by Texas Instruments Incorporated of Dallas, Tex. However, the controller 161 could alternatively be implemented with any other suitable processor and/or board.

The controller 161 is coupled through a local bus 162 to six analog-to-digital converters (ADCs), and each ADC 163 receives at 152 the output of respective one of the six sensors. The controller 161 can thus read each of the six sensors through the ADCs 163 and the lines 152. The controller 161 is also coupled through the local bus 162 to nine digital-to-analog converters (DACs) 166, each of which is in turn coupled by a respective power amplifier 167 to one of the lines 153 leading to one of the nine coils 11–19. Thus, by using the bus 162, the DACs 166 and the power amplifiers 157, the controller 161 can independently control the respective currents flowing through the nine coils 11–19. In the disclosed embodiment, the controller 161 digitally implements feedback control of the current supplied to each of the coils 11–19, as a function of information which is received from the sensors, as discussed later.

The controller 161 is also coupled to a global bus 171, through which it communicates with one port of a dual-port dynamic random access memory (DRAM) 172. The other port of the dual-port DRAM 172 is coupled to a VersaModule Eurocard (VME) bus 173, which is a type of bus known in the art. A VME personal computer (PC) 174 of a known type is also coupled to the VME bus 173, and serves as a user interface, as indicated diagrammatically by a broken line at 178. The dual-port DRAM 172 permits the PC 174 and the controller 161 to efficiently communicate with each other.

The control circuit 151 further includes two static random access memories (SRAMs) 181 and 182, which are respectively coupled to the buses 162 and 171. The SRAMs 181 and 182 are relatively fast memories which provide additional storage during system operation, for purposes that need not be described in detail here. The local bus 162 is provided so that the circuit 151 will have a dedicated bus for high-bandwidth data which flows from the six position sensors to the controller 161, in order to thereby facilitate fast data transfer and a high sampling rate. This also eases data traffic on the other buses 162 and 171 of the control circuit.

FIG. 1 shows a three-dimensional Cartesian coordinate system having an x axis, a y axis and a z axis. The x axis extends parallel to a line which bisects the angle formed by struts 32 and 33, the y axis extends parallel to the horizontal strut 31, and the z axis extends parallel to the vertical struts 34–36. With reference to this 3-dimensional coordinate system, the frame 26 can be moved and positioned with six degrees of freedom, including (1) movement parallel to the x axis, (2) movement to the y axis, (3) movement parallel to the z axis, (4) limited rotation about the x axis, (5) limited rotation about the y axis, and (6) limited rotation about the z axis. The manner in which each of these types of motion can be effected is discussed in more detail below with reference to FIGS. 5–10.

More specifically, FIGS. 5–10 are similar diagrammatic top views of the coils 11–13 and a central portion of the frame 26. FIGS. 5–10 each show how movement can be effected in a manner corresponding to a respective one of the six degrees of freedom. FIGS. 5–10 each show various component forces which cooperate to exert a desired composite force on the frame 26, where each such composite force effectively acts at the center of mass of the frame 26. In FIG. 1, the center of mass is at the center of the triangle defined by the struts 31–33, in the plane of that triangle.

Figure 5:
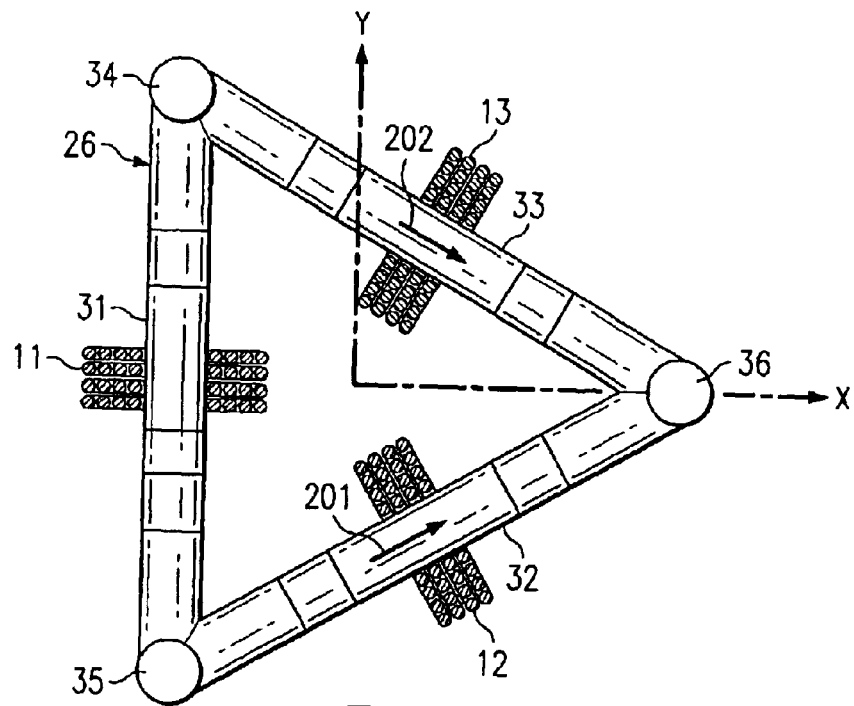
FIGS. 5–10 are each a diagrammatic top view of part of the apparatus of FIG. 1, and each depict a respective set of force components which are applied to a moveable part of the apparatus in order to effect linear or rotational movement thereof.

With reference to FIG. 5, movement parallel to the x axis is effected by energizing the coils 12 and 13 in a manner urging the struts 32 and 33 in the directions shown by respective arrows 201 and 202. The two forces represented by the arrows 201 and 202 cooperate so as to apply to the frame 26 a rightward force acting parallel to the x axis, and this force urges the frame 26 in a rightward or positive direction along the x axis in FIG. 5. On the other hand, if the current supplied to the coils 12 and 13 is reversed, the struts 32 and 33 will be urged in respective directions which are opposite to the directions indicated by arrows 201 and 202, thereby urging the frame 26 in a direction corresponding to leftward movement along the x axis in FIG. 5.

Figure 6:
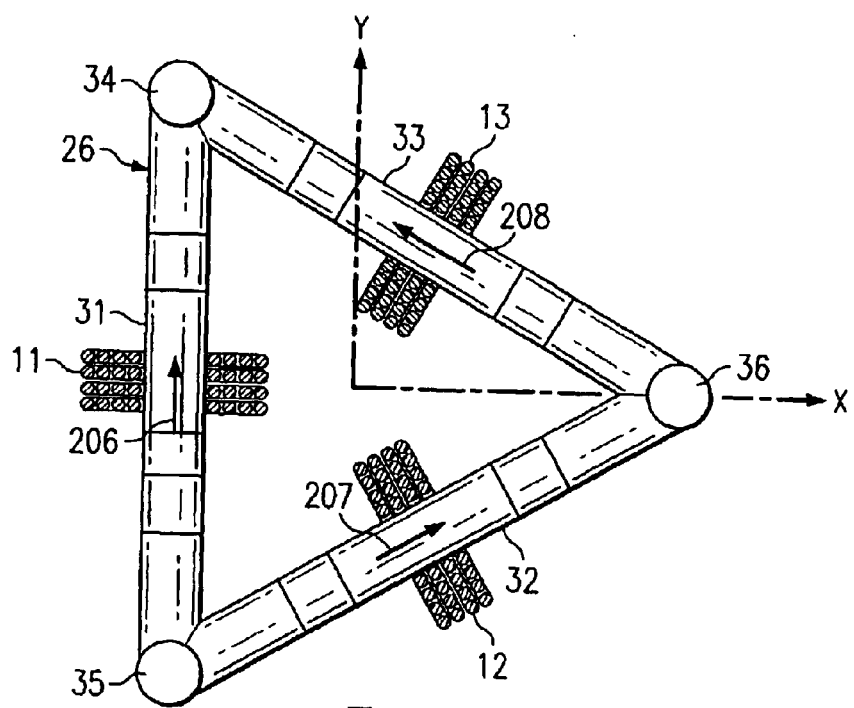

FIG. 6 shows how movement of the frame 26 is effected in directions parallel to the y axis. More specifically, the three coils 11–13 can be energized in a manner which causes the associated struts 31–33 to be urged in respective directions indicated by the three arrows 206–208. The magnitude of the component force generated by each coil is controlled so that the combined result of these component forces is a force directed in a positive direction along the y axis. If the currents supplied to the coils 11–13 are each reversed, the struts 31–33 will each be urged in a respective direction opposite the direction of the arrows 206–208 in FIG. 6, and thus the frame 26 will be urged in an opposite or negative direction along the y axis.

Figure 7:
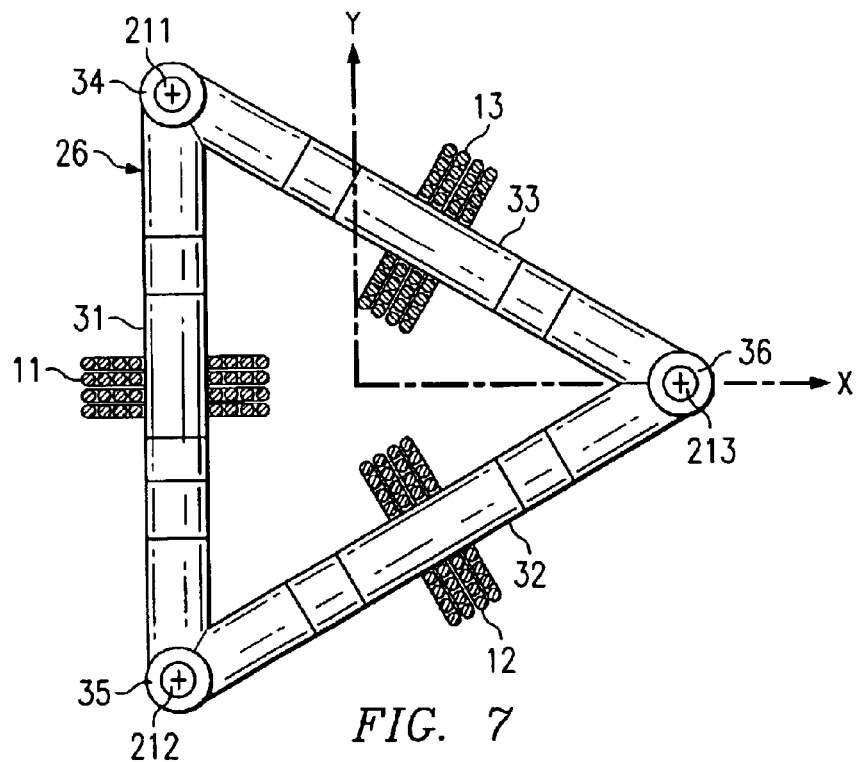

With reference to FIGS. 1 and 7, the six coils 14–19 can each be energized in a manner which causes an upward force to be exerted on each of the three vertical struts 34–36, as indicated diagrammatically by the symbols at 211–213 in FIG. 7. This will urge the entire frame upwardly out of the plane of FIG. 7, in a positive direction along the z axis. As evident from an earlier part of this discussion, the z axis extends perpendicular to the plane of FIG. 7. If the current to each of the coils 14–19 is reversed, each of the struts 34–36 will be urged downwardly, such that the frame 26 will be urged in an opposite or negative direction along the z axis.

Figure 8:
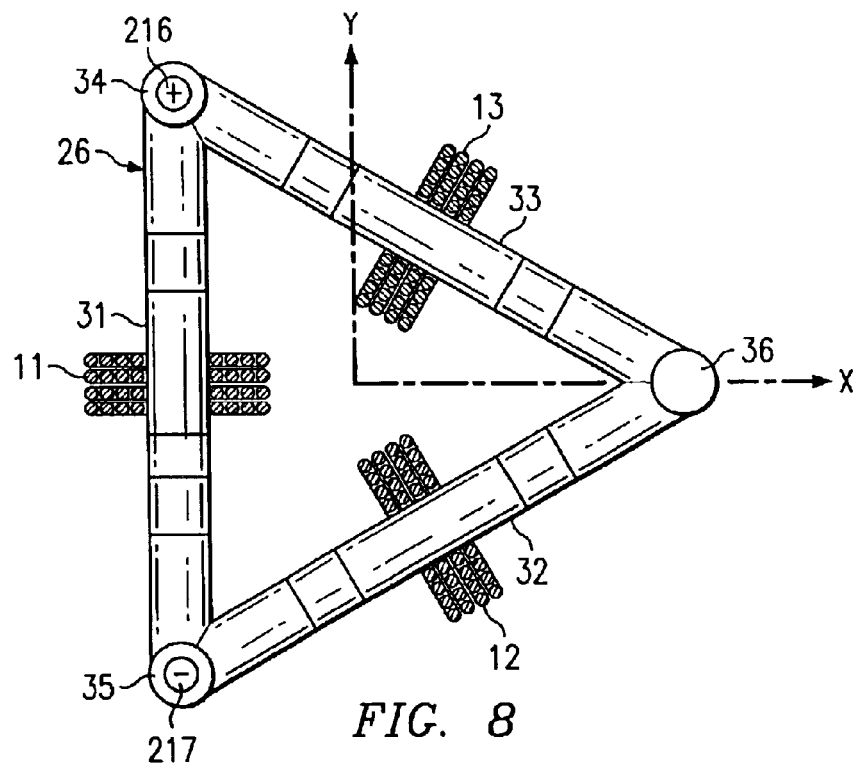

FIG. 8 shows how limited rotational movement about the x axis can be effected. With reference to FIGS. 1 and 8, the coils 14 and 17 are each energized in a manner that urges the strut 34 upwardly, as indicated diagrammatically by the symbol at 216, while the coils 15 and 18 are each energized in a manner that urges the strut 35 downwardly, as indicated diagrammatically by the symbol 217. The overall effect is that the frame 26 is urged to pivot in one rotational direction about the x axis. Alternatively, if the currents supplied to each of the four coils 14, 17, 15 and 18 are reversed, the strut 34 will be urged downwardly and the strut 35 will be urged upwardly, such that the frame 26 will be urged to pivot about the x axis in the opposite direction.

Figure 9:
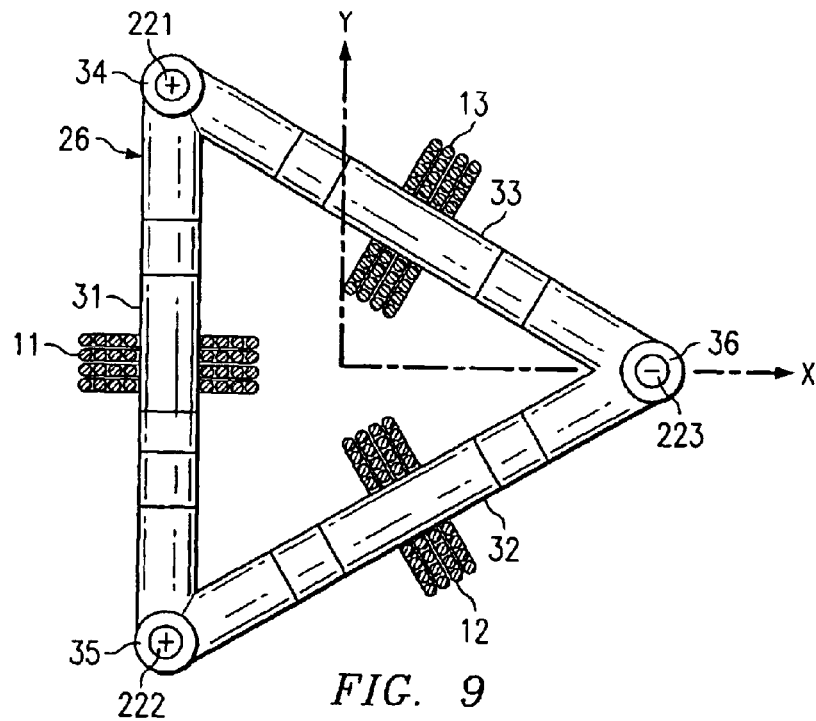

FIG. 9 shows how limited pivotal movement of the frame 26 can be effected about the y axis. With reference to FIGS. 1 and 9, the coils 14–15 and 17–18 are all energized in a manner which exerts upward forces on each of the struts 34 and 35, as indicated diagrammatically by the symbols 221–222. At the same time, the coils 16 and 19 are energized in a manner which exerts a downward force on the strut 36, as indicated diagrammatically at 223. As a result, the frame 26 is urged to pivot in one direction about the y axis. The currents supplied to the six coils 14–19 can be reversed, so that the struts 34 and 35 are urged downwardly, and the strut 36 is urged upwardly. The frame 26 will then be urged to pivot in the opposite direction about the y axis.

Figure 10:
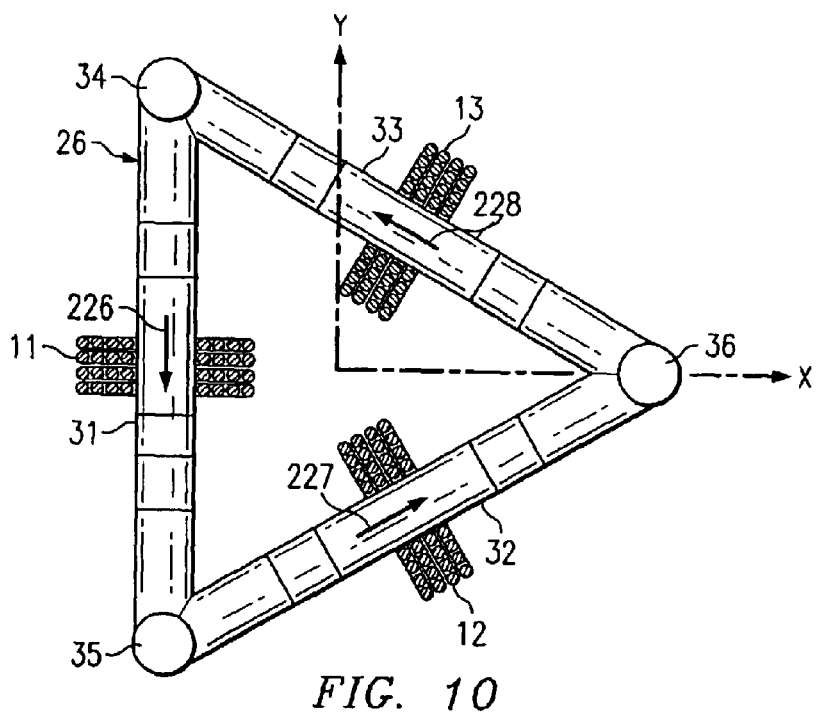

FIG. 10 shows how limited pivotal movement of the frame 26 can be effected about the z axis. As discussed above, the z axis extends perpendicular to the plane of FIG. 10. In more detail, the three coils 11–13 are each energized in a manner which causes the three struts 31–33 to each be urged in a respective direction indicated diagrammatically by a respective arrow 226–228. These three force components have the combined effect of urging the frame 26 to pivot about the z axis in a counterclockwise direction in FIG. 10. On the other hand, if the current flowing through each of the three coils 11–13 is reversed, the forces exerted on the struts 31–33 will be opposite the respective arrows 226–228, causing the frame 26 to be urged to pivot clockwise about the z axis in FIG. 10.

Based on the foregoing discussion of FIGS. 5–10, it will be recognized that the coils 17–19 are effectively redundant to the coils 14–16. In fact, and as mentioned earlier, the coils 14 and 17 are coupled in series, the coils 15 and 18 are coupled in series, and the coils 16 and 19 are coupled in series. Due to the fact that the same current flows through the two coils 14 and 17 associated with strut 34, and due to symmetry, the vertical force exerted on the strut 34 effectively lies on the same plane that contains the triangle defined by struts 31–33, and thus lies on the same plane as the center of mass of the frame 26. The same is true for the struts 35 and 36, and the pair of coils associated with each of them. This actuator arrangement helps to minimize errors in the forces and torques applied across both horizontal and vertical axes. Further, horizontal and vertical dynamics are decoupled in an effective manner, and ideally there are no perturbations in other directions.

On the other hand, it will be recognized that it would be possible to optionally omit the coils 17–19 and the portions of the struts 34–36 which are disposed below the triangle defined by struts 31–33, while still achieving movement of the frame with each of the six degrees of freedom discussed above. Alternatively, it would be possible to optionally omit the coils 14–16 and the portions of the struts 34–36 which are disposed above the triangle defined by the struts 31–33, and still achieve movement of the frame with each of the six degrees of freedom discussed above. In each of these alternative configurations, there would be only six coils rather than nine coils, but the six coils would be capable of effecting movement of the frame with each of the six degrees of freedom discussed above.

With reference to FIG. 1, assume that $f_x$ is the magnitude of the force exerted on the frame 26 in a positive direction along the x axis, $f_y$ is the magnitude of the force exerted on the frame 26 in a positive direction along the y axis, $f_z$ is the magnitude of the force exerted on the frame 26 in a positive direction along the z axis, $\tau_x$ is the magnitude of the torque exerted on the frame 26 in a positive rotational direction about the x axis, $\tau_y$ is the magnitude of the torque exerted on the frame 26 in a positive rotational direction about the y axis, and $\tau_z$ is the magnitude of the torque exerted on the frame 26 in a positive rotational direction about the z axis. In addition, with reference to FIG. 10, assume that $f_{1h}$ is the magnitude of the horizontal force exerted on the strut 31 in the direction of arrow 226 in response to the current flowing through coil 11, $f_{2h}$ is the magnitude of the horizontal force exerted on the strut 32 in the direction of arrow 227 in response to the current flowing through coil 12, and $f_{3h}$ is the magnitude of the horizontal force exerted on the strut 33 in the direction of arrow 228 in response to the current flowing through coil 13. Moreover, assume that $f_{1v}$ is the magnitude of the vertical force exerted upwardly on the strut 34 in response to the current flowing through coils 14 and 17, $f_{2v}$ is the magnitude of the vertical force exerted upwardly on the strut 35 in response to the current flowing through coils 15 and 18, and $f_{3v}$ is the magnitude of the vertical force exerted upwardly on the strut 36 in response to the current flowing through coils 16 and 19. Finally, assume that the letter 1 represents the length of one side of the triangle defined by the struts 31–33. The following is a transformation matrix which relates the magnitude of the forces being exerted on the respective struts to the magnitude of the forces being exerted in directions corresponding to each of the six degrees of freedom:

$$\begin{bmatrix} f_x \\ f_y \\ \tau_z \\ \tau_x \\ \tau_y \\ f_z \end{bmatrix} = \begin{bmatrix} 0 & \sqrt{3}/2 & -\sqrt{3}/2 & & & \\ -1 & 1/2 & 1/2 & & 0 & \\ 1/2\sqrt{3} & 1/2\sqrt{3} & 1/2\sqrt{3} & & & \\ & & & 1/2 & -1/2 & 0 \\ & 0 & & 1/2\sqrt{3} & 1/2\sqrt{3} & -1/\sqrt{3} \\ & & & 1 & 1 & 1 \end{bmatrix} \begin{bmatrix} f_{1h} \\ f_{2h} \\ f_{3h} \\ f_{1v} \\ f_{2v} \\ f_{3v} \end{bmatrix}$$

The controller 161 of FIG. 4 effects feedback control using principles which are known in the art. In this regard, the specific nature of the feedback control in any particular situation will be dependent upon various factors, such as the actual size of the frame 26, the actual weight of the frame 26 and any structure supported by it, the sizes and strengths of the permanent magnets, the sizes of the coils, the number of turns in the coils, and so forth. Persons skilled in the art are familiar with how to optimize feedback control for a given configuration. Accordingly, the feedback control need not be described in detail here. Nevertheless, a very brief discussion of the feedback control is provided for purposes of clarity.

In particular, the controller 161 reads information from the six sensors (including the sensors 126–129 in FIG. 3), in order to determine the actual current position of the frame 26. By comparing this actual position of the frame to a desired position for the frame, a respective error value can be calculated for each of the six degrees of freedom of movement that have been discussed above, including the three linear and three rotational components of movement. Through use of the transformation matrix set forth above, these six error values can be transformed into six different error values that respectively correspond to the six linear forces which need to be exerted along each of the six struts 31–36 in order to effect movement of the frame 26 from its current position toward the desired position. These error values are then used to make appropriate adjustments to the forces which are actually being exerted on each of the six struts, in order to effect movement of the frame toward the desired position. This feedback control is implemented digitally within the controller 161, and can include lead-lag compensation according to known techniques, and/or filtering according to known techniques.

Due to the information received by the control circuit 151 from the six sensors, the control circuit 151 can optionally be configured to provide motion and/or force feedback to an input device operated by a human operator, such as a joystick that operates with six degrees of freedom. Persons skilled in the art will recognize how to implement such feedback to an input device, and the present discussion therefore does not include a detailed discussion of how to implement such motion and/or force feedback to an operator.

Person skilled in the art will recognize that, depending upon factors such as the size of the frame and the weight of the payload, an appropriate size of the actuators for a given application can be determined by using the Lorentz force law:

$$f_z = \int (J_\phi \times B_f) dV$$

where $J_\phi$ is the current density in the coil (in A/m$^2$), $B_r$ is the magnetic flux density due to the magnet within the coil (T), and $f_z$ is the force density acting on the coil (in N/m$^3$). This integration is evaluated over the whole volume of the coil.

In the disclosed embodiment, the six struts 31–36 of the frame 26 each have a length of approximately 70 millimeters. The frame 26 has a mass of about 0.2 kilograms, and can support a payload having a weight up to approximately 1 kilogram. Each coil and the associated magnet pair is considered to be an actuator, and each such actuator can produce a driving force of up to approximately 2 Newtons. The nominal power consumption per actuator is about 12 milliwatts. The frame 26 has a travel range in each linear direction of approximately 300 micrometers, with a resolution or repeatability of approximately 5 nanometers. The frame 26 has a travel range in each angular direction of approximately 3 milliradiuns, with an angular resolution or repeatability of about 50 nanoradians. The maximum acceleration of the frame is approximately 30 meters/second$^2$. Since the frame 26 is compact and has a high structural resonance mode, the disclosed embodiment has a control bandwidth on the order of approximately 100 Hz. This control bandwidth can be even higher if notch filters are implemented at system resonance frequencies. Of course, the specific values given here are merely exemplary, and are provided to facilitate an understanding of the present invention. It will be recognized that a variety of modifications can be made to the disclosed apparatus without departing from the scope of the present invention, and that modified versions of the disclosed apparatus will have operational characteristics and values which differ from the exemplary values set forth here.

The capacitive type of sensors utilized in the disclosed embodiment may experience a small amount of noise, but are adequate for the majority of applications. In the small subset of applications where better resolution is needed, it is possible to alternatively use higher quality sensors, such as laser interferometers. Of course, higher quality sensors such as laser interferometers will increase the overall cost of the system, but for some applications the additional cost will be justified.

With reference to FIG. 3, the foregoing discussion explains that the support 101 and the associated coils are stationary, and that the frame 26 with the permanent magnets is movable. However, it will be recognized that this movement is relative. In other words, the frame 26 with the magnets could be stationary, and the support 101 and coils thereon could move relative to the frame 26.

Figure 11:
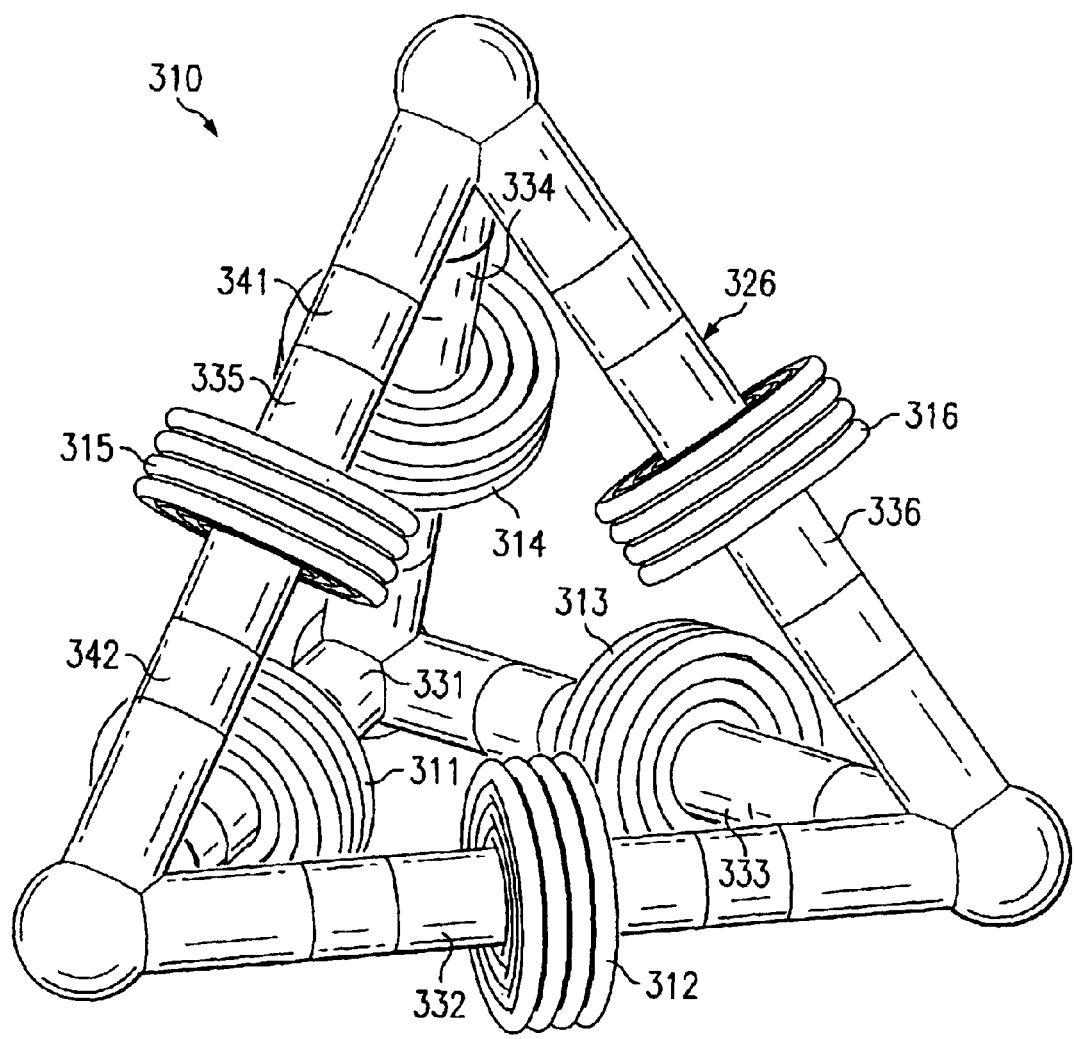
FIG. 11 is a diagrammatic perspective view of an apparatus which is an alternative embodiment of the apparatus shown in FIG. 1.

FIG. 11 is a diagrammatic perspective view of an apparatus 310 which is an alternative embodiment of the apparatus 10 of FIG. 1. The apparatus 310 includes six coils 311–316, which are each fixedly mounted on a stationary support that has been omitted from FIG. 11 for clarity. The apparatus 310 includes a frame 326, which is supported for movement with six degrees of freedom in relation to the stationary coils 311–316. The frame 326 includes six struts 331–336, which are fixedly coupled to each other in a configuration where each strut corresponds to a respective edge of a regular tetrahedron. Stated differently, the three struts 331, 332 and 333 define an equilateral triangle, the three struts 332, 335 and 336 define an equilateral triangle, the three struts 331, 334 and 335 define an equilateral triangle, and the three struts 333, 334 and 336 define an equilateral triangle. The six struts 331–336 each extend movably through a respective one of the coils 311–316, with each coil disposed approximately halfway along the associated strut.

The struts 331–336 are all identical in structure, and each includes two spaced magnets, for example as shown at 341 and 342 for the strut 335. The remaining three portions of each strut, or in other words the is central portion between the magnets and the two end portions, are each made from a non-magnetic material such as aluminum. The apparatus of 310 of FIG. 11 is controlled by a control circuit similar to that shown at 151 in FIG. 4.

The tetrahedral frame shown in FIG. 11 has a very high stiffness, and is very compact. An excellent damping property can be obtained in association with feedback control. Through appropriate control of the respective currents supplied to the six coils 311–316, the frame 326 can be magnetically levitated, and moved with six degrees of freedom.

The present invention provides a number of technical advantages. One such advantage is that there are no electromagnets or other electrical components on the moving frame. As a result, there is no need for an umbilical cable to electrically couple the frame to a control system. Consequently, the frame will not receive vibrations from external structure through the umbilical cable. A further advantage is that each of the disclosed frames can be constructed so that it is very stiff but also very lightweight, thereby increasing the natural frequencies of the systems which use these frames. In this regard, since there is only a single moving part in each of the disclosed embodiments, they will have higher natural frequencies than multiple-linkage systems, which inherently have more complex dynamics and a high mechanical impedance.

Another advantage is that, when the disclosed embodiments are implemented without the use of any iron material, it is possible to achieve a high bandwidth without eddy currents. Yet another advantage is that, since the moving frame of each embodiment generates magnetic fields using only permanent magnets, and does not have any electromagnetic coils or other electrical components, the frame itself does not generate any heat.

Still another advantage is that, since the only moving part is fully levitated, there is no need for precision bearing surfaces, which in turn reduces fabrication costs. In this regard, since the positioning accuracy of a magnetically levitated frame is not limited by bearing surfaces, the disclosed embodiments can be readily scaled downwardly, to facilitate their use with future applications that involve smaller size and/or greater precision. A further advantage of levitation is that it avoids various non-linear and stochastic characteristics, such as friction, stiction and backlash between moving parts. Still another advantage of levitation is that no lubricants are required, and no wear particles are generated. Consequently, the disclosed embodiments are well suited for use in clean rooms or vacuum environments.

Still another advantage is that, by avoiding the need for complex mechanical elements or linkages, the fabrication cost is relatively low, and reliability is relatively high. Yet another advantage is that, because of the relatively compact size and low inertia of each disclosed frame, power consumption is relatively low. The disclosed embodiments provide ultra-fine control of movement with six degree of freedom. Linear and rotational forces are produced with a high degree of resolution.

Although selected embodiments have been illustrated and described in detail, it will be understood that various substitutions and alterations are possible without departing from the spirit and scope of the present invention, as defined by the following claims.

What is claimed is:

1. An apparatus comprising first and second sections supported for relative movement, said first section having a plurality of first portions which extend along respective different axes, and said second section having a plurality of approximately annular second portions which each extend around a respective said axis and which each have a respective said first portion extending movably therethrough, each said second portion and the first portion extending therethrough being a respective pair, wherein said portions of each said pair can each generate a respective magnetic field, the magnetic field generated by one of said portions of each said pair being a function of an electrical signal, the magnetic field generated by said second portion of each said pair being approximately annular, and interaction of magnetic fields generated by said portions of each said pair urging movement of the first portion thereof relative to the second portion thereof in a direction approximately along said axis associated with the first portion.

2. An apparatus according to claim 1, wherein for each said pair said second portion includes an annular coil of electrically conductive wire, and said first portion extends through said coil.

3. An apparatus according to claim 2, wherein for each said pair said first portion includes a permanent magnet disposed in the region of said coil.

4. An apparatus according to claim 2, wherein for each said pair said first portion includes two permanent magnets disposed on opposite sides of a non-magnetic portion, said non-magnetic portion being approximately aligned with said coil, and said magnets being disposed on opposite sides of said coil.

5. An apparatus according to claim 2, including a circuit which can selectively supply a respective different current to each of said coils.

6. An apparatus according to claim 5, wherein said circuit can selectively control the direction of current flow for each of said coils.

7. An apparatus according to claim 5,
wherein said circuit includes a sensor section which outputs information representing the position of one of said first and second sections relative to the other thereof; and
wherein said circuit effects feedback control of the currents supplied to said coils as a function of the information from said sensor section.

8. An apparatus according to claim 1,
including six said pairs of said first and second portions; and
wherein said axes associated with said six pairs are oriented so that said six pairs can effect relative movement of said first and second sections with six degrees of freedom.

9. An apparatus according to claim 8, wherein three of the six axes of said six pairs are oriented with respect to each other so that each defines a respective edge of a triangle which is substantially an equilateral triangle, and the other three of the six axes of said six pairs each extend approximately perpendicular to a plane of the triangle in the region of a respective apex of the triangle.

10. An apparatus according to claim 8, wherein the six axes of said six pairs are oriented with respect to each other so that that each defines a respective edge of a regular tetrahedron.

11. An apparatus according to claim 1, wherein said first section includes a frame having six elongate parts which are fixedly secured to each other, each of said parts including a respective one of said first portions.

12. An apparatus according to claim 11, wherein three of said parts form a triangle which is substantially an equilateral triangle, and the other three of said parts each extend approximately perpendicular to a plane of the triangle in the region of a respective apex of the triangle.

13. An apparatus according to claim 11, wherein said six parts each define a respective edge of a regular tetrahedron.

14. An apparatus according to claim 1, wherein each said pair serves as a single-axis linear actuator.

15. A method of operating an apparatus which includes first and second sections supported for relative movement, said first section having a plurality of first portions which extend along respective different axes, and said second section having a plurality of approximately annular second portions which each extend around a respective said axis and each have a respective said first portion extending movably therethrough, each said second portion and the first portion extending therethrough being a respective pair, said method comprising the steps of:
causing said first portion of each said pair to generate a magnetic field;
causing said second portion of each said pair to generate a magnetic field which is approximately annular, the magnetic field generated by one of said portions of each said pair being a function of an electrical signal; and
causing said magnetic fields generated by said first and second portions of each said pair to interact in a manner urging movement of the first portion relative to the second portion in a direction approximately along said axis associated with the first portion.

16. A method according to claim 15, including the step of selecting as said second portion of each said pair an annular coil of electrically conductive wire, said first portion of the pair extending through the coil.

17. A method according to claim 16, including the step of selecting as said first portion of each said pair at least one permanent magnet which is disposed in the region of said coil of that pair.

18. A method according to claim 16, including the steps of:
selecting as said first portion of each said pair two permanent magnets disposed on opposite sides of a non-magnetic portion; and
aligning said non-magnetic portion of each said pair approximately with the associated coil, so that said magnets of that pair are disposed on opposite sides of said coil.

19. A method according to claim 16, including the steps of:
sensing the position of one of said first and second sections relative to the other thereof; and
effecting feedback control of currents supplied to said coils as a function of the sensed position.

20. A method according to claim 15, including the steps of:
configuring said apparatus to include six of said pairs of said first and second portions; and
orienting said axes associated with said six pairs so that said six pairs can effect relative movement of said first and second sections with six degrees of freedom.

21. A method according to claim 20, wherein said orienting step includes the steps of:
orienting three of the six axes of said six pairs with respect to each other so that each defines a respective edge of a triangle which is substantially an equilateral triangle; and
orienting the other three of the six axes of said six pairs to each extend approximately perpendicular to a plane of the triangle in the region of a respective apex of the triangle.

22. A method according to claim 20, wherein said orienting step includes the step of orienting the six axes of said six pairs with respect to each other so that that each defines a respective edge of a regular tetrahedron.

* * * * *